United States Patent [19]

Lum

[11] Patent Number: 5,172,873
[45] Date of Patent: Dec. 22, 1992

[54] ANTI-ROLL SYSTEM FOR A MISSILE LAUNCHER

[75] Inventor: Robert W. Lum, Levittown, N.Y.

[73] Assignee: Grumman Aerospace Corporation, Bethpage, N.Y.

[21] Appl. No.: 699,728

[22] Filed: May 14, 1991

[51] Int. Cl.$^5$ .............................................. B64D 1/12
[52] U.S. Cl. .............................. 244/137.4; 244/118.1; 89/1.54; 89/1.53; 294/82.26
[58] Field of Search ......................... 244/137.4, 118.1; 89/1.54, 1.53, 1.58, 1.59; 294/82.26

[56] References Cited

U.S. PATENT DOCUMENTS

| | | | |
|---|---|---|---|
| 1,784,011 | 12/1930 | Jones | 89/1.53 |
| 2,826,119 | 3/1958 | Barrowman | 294/82.26 |
| 3,016,258 | 1/1962 | Landry | 294/82.26 |
| 4,129,271 | 12/1978 | Hasquenoph et al. | 89/1.54 X |
| 4,440,365 | 4/1984 | Holtrop | 89/1.54 X |
| 4,826,105 | 5/1989 | Smiley | 244/137.4 X |

FOREIGN PATENT DOCUMENTS 0304422 3/1955 Fed. Rep. of Germany ....... 89/1.54

Primary Examiner—Joseph F. Peters, Jr.
Assistant Examiner—Christopher P. Ellis
Attorney, Agent, or Firm—Bacon & Thomas

[57] ABSTRACT

An anti-roll system for a missile launcher mechanism is disclosed wherein an ejector foot, operatively associated with the launcher to eject the missile from the launcher, has a pair of tabs which contact missile latching lugs on the missile to prevent roll of the missile about its longitudinal axis during missile launching. When carried by the aircraft, the missile is latched by a latching system against the ejector foot to provide stable support for the missile during aircraft maneuvering. When the missile is launched, the latching system is unlatched and the ejector foot urges the missile away from the launcher. At the end of its movement, the missile continues its movement away from the launcher and separates from the ejector foot. The missile typically has a pair of latching lugs that extend from the outer periphery of the missile body and which are gripped by the missile latching system. Tabs associated with the ejector foot bear against lateral surfaces of the latching lugs as long as the missile is in contact with the ejector foot. The contact between the tabs and the latching lugs positively prevents any rotation of the missile about its longitudinal axis as long as it is in contact with the ejector foot. In order to allow the missile to separate from the ejector foot, one of the tabs may be pivotally attached to the ejector foot such that it will be pivoted out of the way of the latching lugs as the missile separates from the ejector foot.

14 Claims, 2 Drawing Sheets

ANTI-ROLL SYSTEM FOR A MISSILE LAUNCHER

BACKGROUND OF THE INVENTION

The present invention relates to an anti-roll system for a missile launcher that prevents a missile from rotating about its longitudinal axis upon ejection from a launching apparatus attached to an aircraft.

Missiles launched from aircraft are subject to external forces when they are ejected and separated from the missile launchers. These external forces may cause the missile to roll about its longitudinal axis in an unpredictable fashion, possibly causing damage to the missile and/or the aircraft. Such missiles typically have control wings or fins arranged in a generally cruciform pattern extending generally radially from the cylindrical body of the missile. In cases where the missile is carried with the wings or fins oriented in generally vertical and horizontal positions, the unpredictable rolling movement may cause contact between the vertical wings or fins and either the missile launcher or the aircraft.

A known method of controlling this unpredictable roll movement is to provide strips on the interior of the launcher housing to allow the vertical wing or fin within the launcher cavity to rub against the strips during the ejection and launching of the missile. However, this method requires a missile wing or fin having substantial structural rigidity in order to avoid causing damage to the wing or fin and provided virtually no control of the missile after the wing or fin passed out of contact with the rub strips. This method is not usable with the latest missiles which have wings or fins that are lighter and smaller in cross-section. These fins simply do not have the structural rigidity to act as anti-rotation guides during the launch.

SUMMARY OF THE INVENTION

An anti-roll system for a missile launcher mechanism is disclosed wherein an ejector foot, operatively associated with the launcher to eject the missile from the launcher, has a pair of tabs which contact latching lugs on the missile to prevent roll of the missile about its longitudinal axis during missile launching. When carried by the aircraft, the missile is latched by a latching system against the ejector foot to provide stable support for the missile during aircraft maneuvering. When the missile is launched, the latching system is unlatched and the ejector foot urges the missile away from the launcher. At the end of its movement, the missile continues its movement away from the launcher and separates from the ejector foot.

The missile typically has a pair of latching lugs that extend from the outer periphery of the missile body and which are gripped by the missile latching system. A pair of tabs associated with the ejector foot bear against lateral surfaces of the latching lugs as long as the missile is in contact with the ejector foot. The contact between the tabs and the latching lugs positively prevents any rotation of the missile about its longitudinal axis as long as it is in contact with the ejector foot.

In order to allow the missile to separate from the ejector foot, one of the tabs may be pivotally attached to the ejector foot such that it will be pivoted out of the way of the latching lugs as the missile separates from the ejector foot.

DETAILED DESCRIPTION OF THE PREFERRED EMBODIMENT

Figure 1:
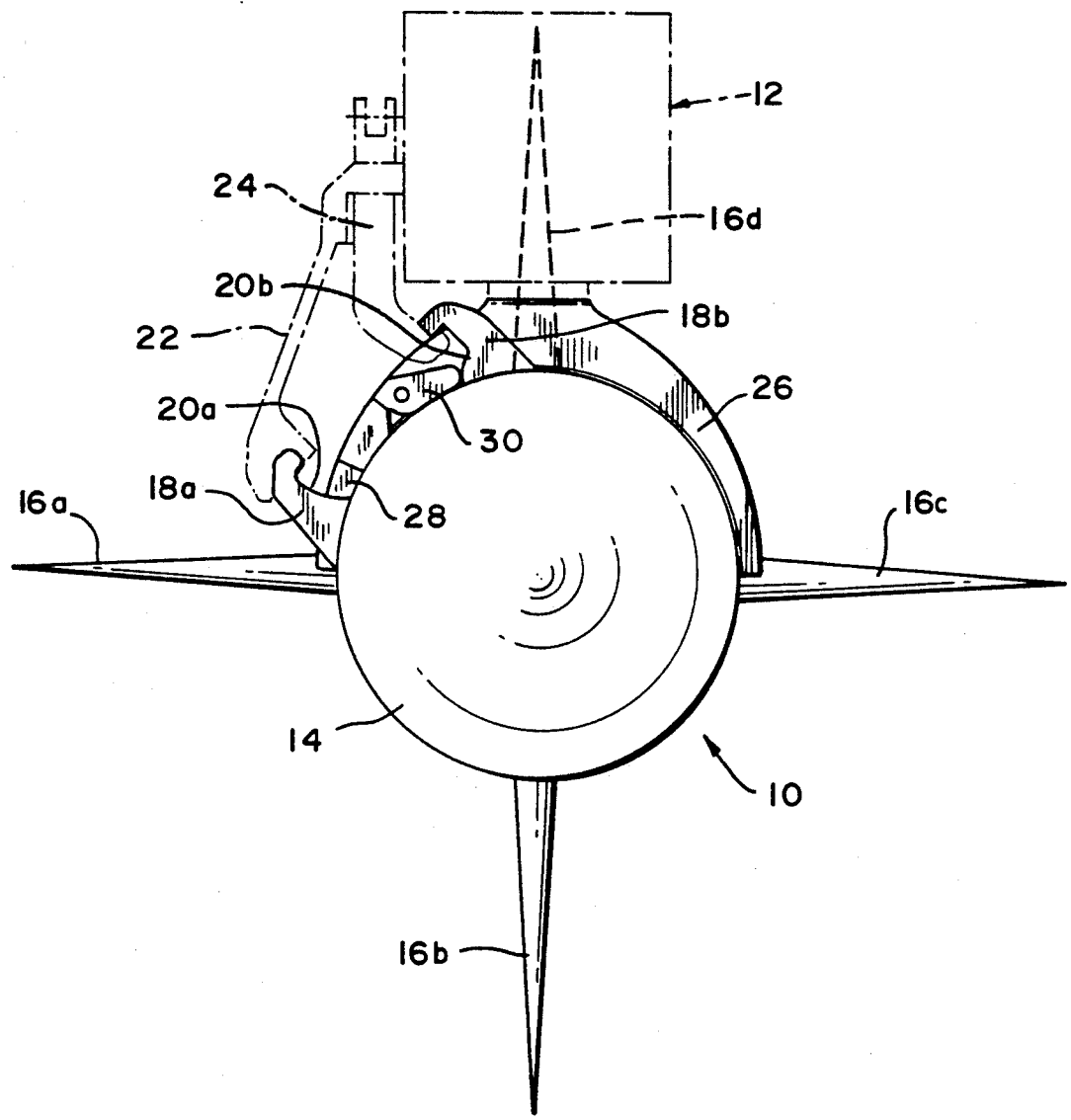
FIG. 1 is a front view of a missile attached to a launcher mechanism.

FIG. 1 illustrates a front view of a missile, generally indicated at 10, attached to a launcher mechanism 12. The missile 10 comprises a generally cylindrical missile body 14 having a plurality of wings or fins extending generally radially therefrom, illustrated at 16a, 16b, 16c and 16d. As the elements are illustrated in FIG. 1, it is to be understood that launcher 12 may be attached to the wing or the fuselage of an aircraft (not shown) and wings or fins 16a and 16c extend generally horizontally, while wings or fins 16b and 16d extend generally vertically. As can be seen, fin 16d will extend into the interior of the launcher mechanism 12.

The missile 10 has latching lugs 18a and 18b extending from an outer surface of missile body 14 and are circumferentially spaced apart around the perimeter of the missile body 14 so as to define surfaces 20a and 20b which generally face each other. The latching lugs 18a and 18b are gripped by a latching system having latching arms 22 and 24. In known fashion, arm 24 is movable so as to release its contact with latching lug 18b. Once this action has taken place, latching lug 18a may separate from arm 22.

In the latched position, body 14 of missile 10 is in contact with the concave surface of ejector foot 26 so as to provide stability to the missile during aircraft maneuvers. Ejector foot 26 is operatively associated with the launcher mechanism 12. In known fashion, ejector foot 26 may move downwardly with respect to the launcher mechanism 12 in order to urge the missile 10 away from the launcher mechanism.

In order to launch the missile 10, the latching arm 24 is disengaged from latching lug 18b and downward movement of the ejector foot 26 urges the missile 10 downwardly away from the launching mechanism 12. Once the latching lugs 18a and 18b are out of engagement with latching arms 22 and 24, the missile may be subjected to the external forces which tend to cause it to rotate about its longitudinal axis. Such rotation is prevented by tabs 28 and 30 associated with the ejector foot 26. Tabs 28 and 30 are positioned such that they contact the generally facing surfaces 20a and 20b on the latching lugs 18a and 18b. Such contact positively prohibits the missile 10 from rotating about its longitudinal axis as long as it is in contact with the ejector foot 26.

Figure 3:
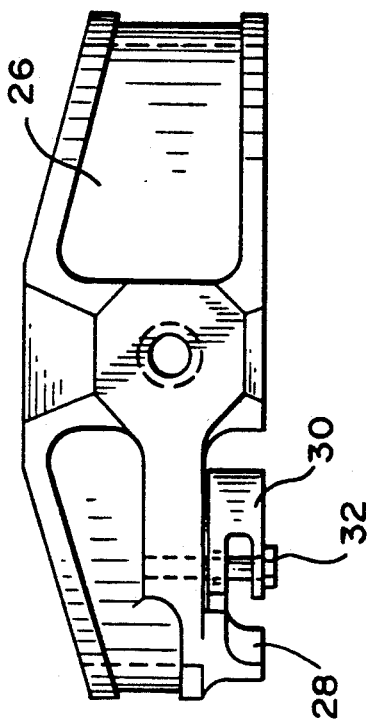
FIG. 3 is a top view of the ejector foot portion shown in FIG. 2.
Figure 2:
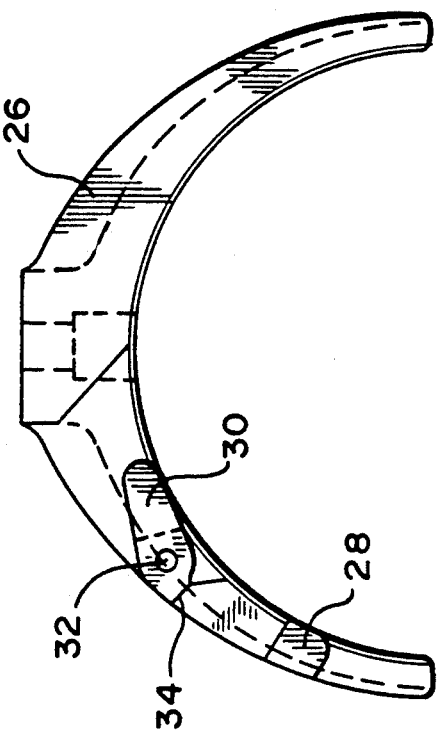
FIG. 2 is a front view of a portion of the ejector foot incorporating the anti-roll system according to the present invention.
Figure 4:
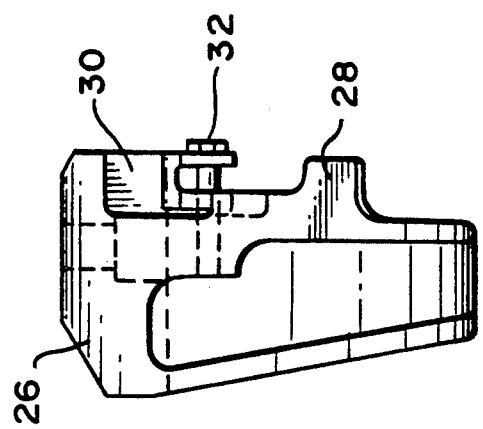
FIG. 4 is a side view of the ejector foot illustrated in FIGS. 2 and 3.

As illustrated in FIGS. 2-4, tab 28 may be formed as an integral part of the ejector foot 26 or may be formed separately and rigidly attached thereto. Tab 30 is pivotally attached to the ejector foot 26 via pivot means 32. Tab 30 may be formed with surface 34 which abuts against a fixed surface on the ejector foot 26 in order to prevent the tab 30 from rotating about the pivot device 32 in a counter-clockwise direction beyond the position illustrated in FIG. 2. However, tab 30 may freely rotate about the pivot 32 in a clockwise direction, as illustrated in FIG. 2. This allows the missile body 14 to separate from the ejector foot 26 without interference from the latching lug 18b. As the missile 10 separates downwardly away from the ejector foot 26, latching lug 18b will contact the tab 30 so as to rotate it about the pivot device 32.

Although the anti-rotation system according to the present invention has been described in terms of its usage on a missile launching system, it is to be understood that the principles are equally applicable to any system in which it is desired to prevent rotation of an object being urged in a given direction.

The foregoing description is provided for illustrative purposes only and should not be construed as in any way limiting this invention, the scope of which is defined solely by the appended claims.

I claim:

1. An anti-roll device for a missile launcher mechanism including a ejection launcher and a missile latching system comprising:
    a) latching lug means affixed to the missile adapted to engage the missile latching system;
    b) ejector foot means operatively associated with the launcher and bearing against the missile so as to urge it away from the launcher during launching of the missile; and,
    c) tab means operatively associated with the ejector foot and located so as to contact the latching lug means to prevent rolling of the missile about a longitudinal axis during launch.

2. The anti-roll device of claim 1 wherein the latching lug means comprises at least a pair of latching lugs.

3. The anti-roll device of claim 2 wherein the tab means comprises at least two tabs located such that each tab contacts one of the latching lugs.

4. The anti-roll device of claim 3 further comprising means to pivotally attach one of the tabs to the ejector foot means.

5. The anti-roll device of claim 3 wherein the latching lugs are displaced around the cross-sectional perimeter of the missile and define surfaces generally facing each other.

6. The anti-roll device of claim 5 wherein the tabs are located so as to contact the generally facing surfaces of the latching lugs.

7. The anti-roll device of claim 6 further comprising means to pivotally attach one of the tabs to the ejector foot means.

8. A missile launching mechanism for moving a missile having a longitudinal axis along a path of travel generally perpendicular to its longitudinal axis and preventing rotation of the missile about the longitudinal axis comprising:
    a) lug means extending from the missile;
    b) a moving member in contact with the missile such that movement of the moving member moves the missile along the path of travel; and,
    c) tab means operatively associated with the moving member and located so as to contact the lug means, such contact preventing rotation of the missile about the longitudinal axis extending generally perpendicular to the path of travel.

9. The mechanism of claim 8 wherein the lug means comprises at least a pair of lug members.

10. The mechanism of claim 9 wherein the tab means comprises at least two tab members located such that each tab member contacts one of the lug members.

11. The mechanism of claim 10 further comprising means to pivotally attach one of the tab members to the moving member.

12. The mechanism of claim 10 wherein the lug members are spaced apart and define surfaces generally facing each other.

13. The mechanism of claim 12 wherein the tab members are located so as to contact the generally facing surfaces of the lug members.

14. The mechanism of claim 13 further comprising means to pivotally attach one of the tab members to the moving member.

* * * * *